March 16, 1954 R. G. RODKEY 2,672,260
PLANTER AND SEEDER
Filed March 10, 1949 2 Sheets-Sheet 1
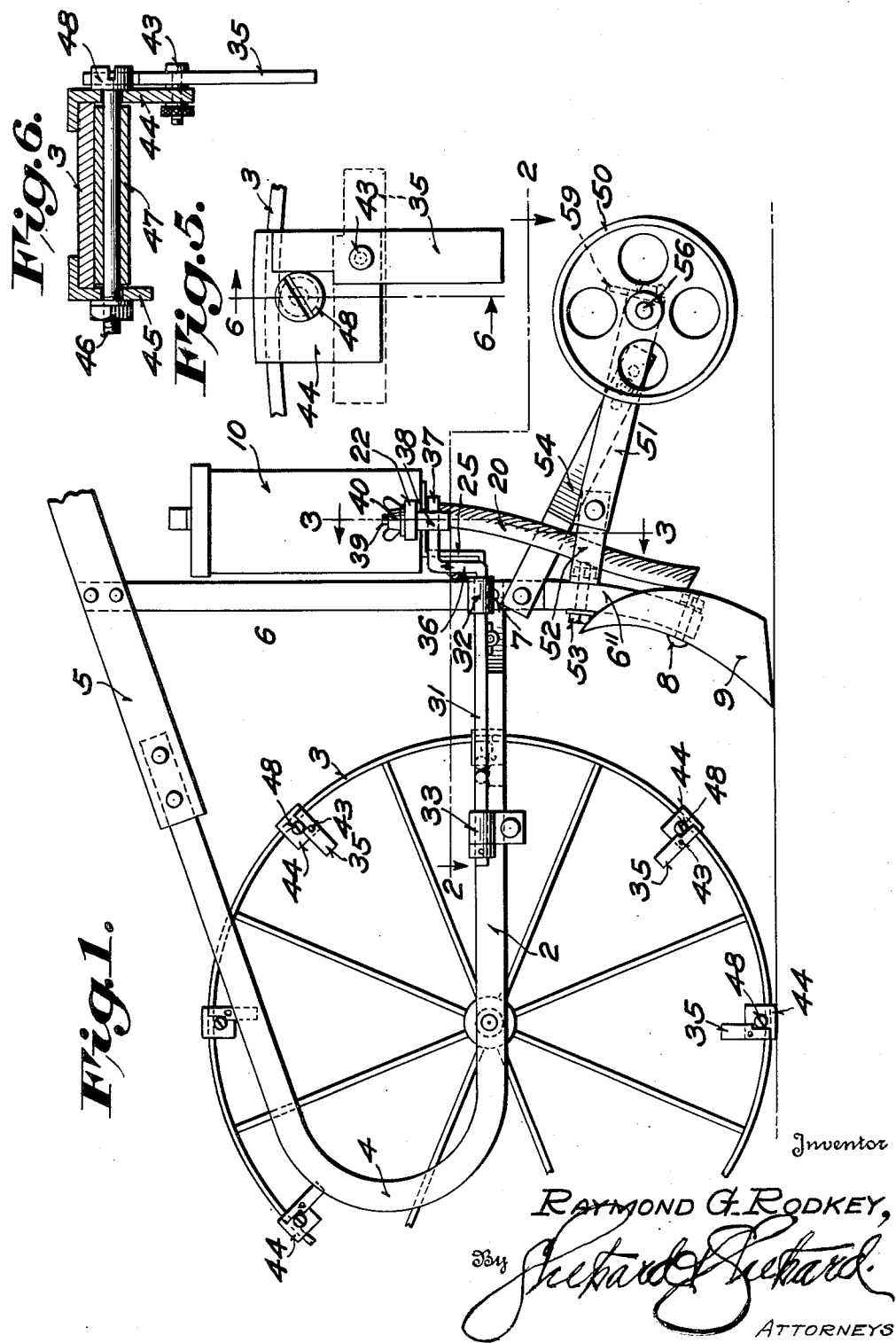
Inventor
RAYMOND G. RODKEY,
By Richard & Richard
ATTORNEYS March 16, 1954     R. G. RODKEY     2,672,260
PLANTER AND SEEDER
Filed March 10, 1949                            2 Sheets-Sheet 2
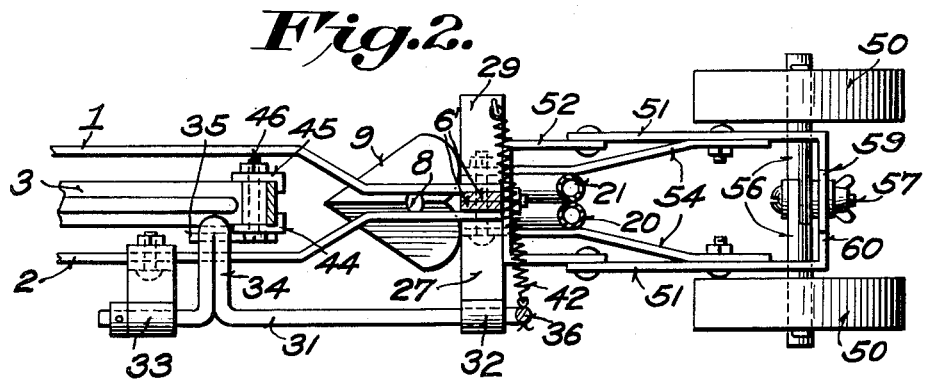
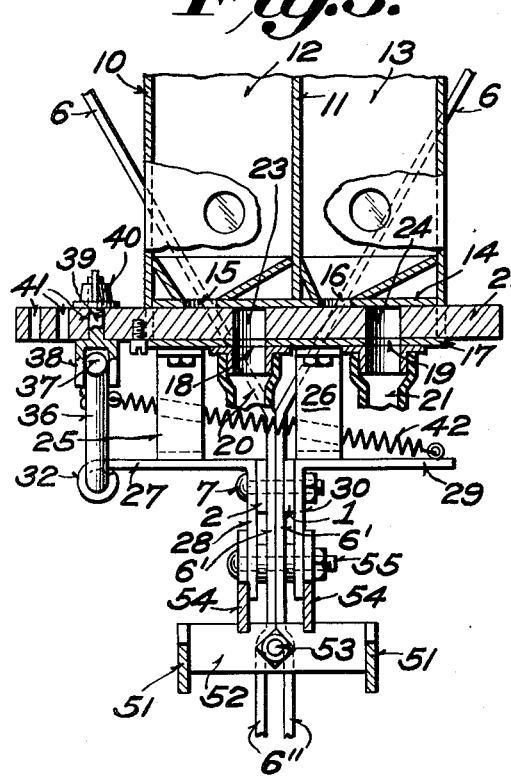
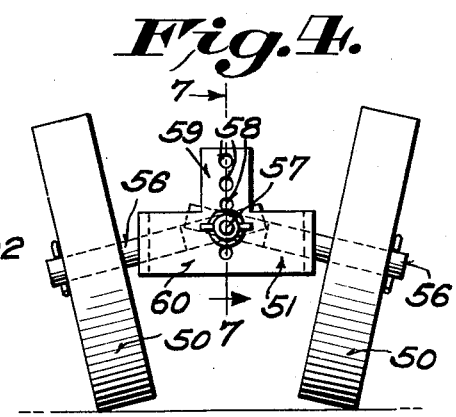
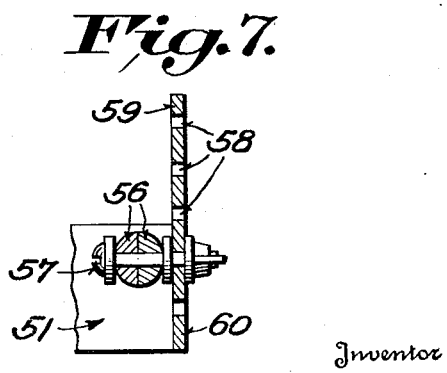
Inventor
RAYMOND G. RODKEY,
ATTORNEYS Patented Mar. 16, 1954

2,672,260

UNITED STATES PATENT OFFICE 2,672,260

PLANTER AND SEEDER

Raymond G. Rodkey, Pittsburgh, Pa.

Application March 10, 1949, Serial No. 80,726

1 Claim. (Cl. 222—177)

This invention is a planter and seeder of the hand propelled type and utilizes an ordinary hand cultivator with which the planter features of the present invention may be incorporated.

It is an object of the present invention to embody the features thereof in the form of an attachment capable of being mounted upon an ordinary hand cultivator so as to convert the same into a hand planter without change in the cultivator while at the same time permitting of the use of the device as a cultivator without requiring the removal of the planter features.

Another object of the present invention is to provide for conveniently and satisfactorily actuating the seed dropping valve by the rotation of the ground or supporting wheel and also to provide for varying the operation of the seed dropping valve to drop seeds at any predetermined interval.

The attachment of the present invention is complete in itself and may be applied and removed without requiring any alteration in the hand cultivator.

With these and other objects in view, the present invention consists in the combination and arrangement of parts as will be hereinafter more fully described, illustrated in the accompanying drawings and pointed out in the appended claim, it, of course, being understood that changes in the form, proportion, size and minor details may be made, within the scope of the claim, without departing from the spirit or sacrificing any of the advantages of the invention.

In the drawings:

Figure 1 is a side elevation of a seeder and planter embodying the features of the present invention.

Figure 2 is a fragmentary plane section on the line 2—2 of Figure 1.

Figure 3 is an enlarged detail vertical transverse sectional view on the line 3—3 of Figure 1.

Figure 4 is a detailed rear elevation of the tiltable wheel covering device.

Figure 5 is an enlarged detailed side elevation of one of the trip devices employed on the ground wheel of the device.

Figure 6 is a sectional view on the line 6—6 of Figure 5.

Figure 7 is a detail sectional view on the line 7—7 of Figure 4.

In the embodiment of the invention shown in the accompanying drawings it will be seen that the present device has a frame including a pair of horizontally spaced side bars 1 and 2 between the forward end portions of which is journalled a ground wheel 3. The rear portions of the frame members 1 and 2 support the feed box and other parts as will be hereinafter described. The forward end portion of each frame bar is bowed upwardly and rearwardly as at 4 and is continued rearwardly and upwardly to form a handlebar 5 shown in the accompanying drawings as a separate member suitably secured to the upper rear end of each frame member.

Secured to and depending from each handle portion 5 is a frame standard 6, the two standards converging inwardly and downwardly as best shown in Figure 3 of the drawings. At the lower end portions, the standards 6 are brought together in mutual contact as at 6′, and extend downwardly between the horizontal frame members 1 and 2 to which they are connected by suitable fastening such as a bolt 7. Below the mutually contacted portions 6′ the frame standards 6 are separated or spaced as indicated at 6″ to accommodate a fastening device 8 for a suitable implement 9 intended to open a furrow in the surface of the ground so that seeds may be dropped into the furrow in rear of the implement 9.

In rear of and adjacent the frame standards 6 is a box or container 10 divided by a vertical partition 11 extending in a direction longitudinally of the device and dividing the box into a seed compartment 12 and a fertilizer compartment 13. Within the bottom portion of the box or container there is a horizontal partition 14 constituting a false bottom provided with outlet openings 15 and 16, respectively, for the discharge of the contents of the compartments 12 and 13. The bottom 17 of the box 10 is provided with spaced openings 18 and 19 in the same vertical plane with the openings 15 and 16 but out of alignment therewith transversely of the device. Flexible conveyor tubes 20 and 21, respectively, are suitably secured to the bottom of the box and in communication with the discharge openings 18 and 19 so as to direct seeds and fertilizer downwardly and discharge the same immediately in rear of the member 9.

Mounted between the bottom 17 and the false bottom 14 is a horizontal flat reciprocatory valve member 22 working through openings in opposite sides of the box and provided with spaced openings 23 and 24. When the openings 23 and 24 in the valve member are in registration with the respective openings 15 and 16 in the false bottom 14, a charge of material may be discharged from the respective compartments into the openings or pockets 23 and 24 in the valve member 22, and when the valve member is subsequently moved endwise into registration with the openings 18 and 19 in the bottom of the box, the material in the pockets 23 and 24 may then discharge by gravity into the respective conductor tubes 20 and 21.

The bottom of the box 10 rests upon a pair of legs 25 and 26 as best shown in Figure 3 of the drawings. The leg 25 rests upon a bracket 27 having a depending leg 28 which is secured to the adjacent frame standard 6 by the fastening 7. The leg 26 rests upon a bracket 29 having a depending member 30 which is secured to the standard 6 by the fastening 7.

Provision is made for reciprocating the valve 22 for discharging the contents of the box 10 into the flexible tubes 20 and 21, and the means for accomplishing this result includes a horizontal rock bar 31 extending in a longitudinal direction of the device and having its rear end portion rotatably mounted in a bearing 32, here shown as an eye bent into the outer end of the bracket member 27. The forward end portion of the rock bar is rotatably mounted in a bearing bracket 33 carried by and projecting horizontally outwardly from the frame bar member 2. The rock bar 31 is provided with an arm 34 immediately in rear of the bearing member 33 and normally resting on the top of the frame bar 2 and having its outer extremity lying in the upward path of tappets 35 provided upon the rim of the ground wheel whereby the rock bar 31 will be rocked during the rotation of the wheel 3. At its rear end the rock bar 31 is provided with a crank member 36 having at its outer end a substantially horizontal arm 37 associated with the reciprocatory valve member 22 for actuating the latter. As illustrated in the drawings, the connection between the valve 22 and the crank arm consists of an inverted substantially U-shaped member or fork 38 having a screw-threaded shank 39 extending upwardly through the valve member 22 and provided upon its upper end with a nut 39. When the rock bar 31 rocks back and forth, the crank 36 will thus reciprocate the valve member 22 and thus provide for the transfer of material from the compartments 12 and 13 to the flexible tubes 20 and 21. The valve member 22 may be provided with a series of openings 41 with which the screw thread shank 39 may be engaged for the purpose of varying the movement of the valve 22. A helical spring 42 has one end connected to the bracket 29 and its other end connected to the crank arm 26 so as to return the rock bar to its original position and pull the valve 22 back to its original position after having been moved by a rocking movement of the rock shaft 31.

By manually turning the rock bar to the left, as viewed in Figure 3, the crank 37 will be swung to the left. The yoke 38 may be detached and shifted to one of the other openings 41, whereby the throw of the valve 22 may be varied to bring the openings 23 and 24 thereof into complete or partial registration with the openings 15 and 18 on the one hand, and 16 and 19 on the other hand, to accommodate the valve to seeds of different sizes, or to feed more or less fertilizer. A stop is carried by the valve for engagement with the seed box to limit the return movement of the valve occasioned by the spring 42. There is, of course, sufficient looseness of the parts to permit of the shifting of the yoke.

Also, the rock bar may be turned to bring the crank 34 out of the path of the tappets on the supporting wheel 3, and the yoke may be shifted on the valve, if necessary, so as to hold the crank 34 out of operating position, whereby operation of the valve and dropping of the seed will be prevented, and the implement may then be used as a cultivator, or move on its wheel 3 for transportation without actuation of the valve.

As indicated in Figure 1 there are a plurality of tappet members 35 mounted on the rim of the wheel 3, and each tappet has the construction illustrated in Figures 5 and 6. Each tappet is in the form of an arm extending radially inwardly from the rim of the wheel and is pivoted between its ends as at 43 on a bracket 44 suitably secured to the rim of the wheel. As shown in Figure 6 there is another bracket 45 located at the opposite edge of the rim 3 of the wheel, and the bolt 46 extends through both brackets for the purpose of clamping them against opposite edges of the rim of the wheel. A sleeve 47 embraces the bolt so that its ends may constitute abutments against which the brackets 44 and 45 may be clamped so as to provide a rigid mounting of the brackets on the rim of the wheel. Each of these brackets is L-shaped or in the form of an angle having one arm bearing against the adjacent edge of the wheel rim 3 while its other arm engages the periphery of the wheel rim. In Figure 5 of the drawings it will be seen that the head 48 of the bolt 46 is disposed to be engaged by the adjacent upright side of the tappet member 35 so as to prevent rotation of the tappet member 35 as it rises with the rotation of the wheel and engages the underside of the crank arm 34 of the rock shaft 31. The tappet member 35, as shown in Figure 5, may be turned into the dotted-line position and held there by tightening the nut on the bolt 46 so as to hold the tappet 35 in an inoperative position whereby any selected number of tappets may be disposed in an inoperative position so as to vary the timing of the rocking operation of the rock shaft 31.

Disposed in rear of the furrow producing implement 9 are a pair of wheels 50 which travel on the ground and, as shown in Figure 4, may be adjusted into various tilted positions for the purpose of pushing earth inwardly over seeds which have been deposited in the furrow so as to effectively cover the same. These wheels are mounted in a substantially rectangular frame 51 having its front end 52 lying against the rear edge portions of the standard portions 6'' to which they are held by means of a bolt 53 extending between the standard portions 6'' and through the end 52 of the frame. Braces 54 extend upwardly and forwardly from opposite sides of the frame 51 so as to overlap the parts 28 and 30 to which they are secured by means of a bolt 55 extending through the parts 6' of the standards 6.

As best shown in Figures 2 and 4 it will be seen that each wheel 50 is provided with a shaft member 56, and these two shaft members overlap at their inner end portions and are connected by a bolt 57 which extends through the overlapped portions of the axles and through any one of a vertical series of openings 58 in a plate or bracket 59 and the cross-bar 60 constituting the rear end of the frame 51 whereby the angular disposition of the covering wheels 50 to the vertical may be adjusted in a very simple and efficient manner.

It will here be explained that the frame 51 carrying the coverer wheels 50 constitute a trailer which follows in rear of the plough 9 and may be adjusted vertically to regulate the depth of operation of the plough 9. The trailer is adjusted vertically by use of the brace means 54 which is provided at its rear end with an adjustable connection with each side bar 51 as, for instance, through the instrumentality of a series of openings, such as shown in dotted lines for the reception of a suitable fastener. The forward ends of the brace members 54 may be provided with a series of openings, not shown, for the reception of the bolt 55 whereby adjustment of the brace means 54 may be obtained at either or both ends thereof. The frame 51 is shown as being connected to the cultivator by a bolt 53, which may be loosened to permit adjustment of the frame and thereafter tightened. Other ways of connecting the frame 51 to the bottom of the cultivator may be employed, the essential thing being to permit vertical tilting of the rear end of the frame on its connection with the cultivator. Another way of effecting this vertical adjustment would be by having the side bars 51 of the trailer frame tiltably connected to the yoke-shaped forward end member 52 of the frame, the bracing means 54 holding the trailer in a relatively rigid condition after the frame 51 has been set to its vertically adjusted position.

I claim:

A seed planter comprising a substantially horizontal frame having handle means for propelling the device, a ground wheel mounted upon the frame, a seed box carried by the frame and provided with a discharge valve, a substantially horizontal rock bar extending longitudinally the frame and provided with a crank operatively connected with the valve, the forward portion of the rock bar having an operating crank arm, and the wheel being provided with a circular series of tappets L-shaped brackets disposed in a circular series on the wheel, the operating crank arm being in the path of the tappets, each tappet comprising a tappet arm pivoted between its ends upon one arm of an L-shaped clip embracing one edge portion of the rim of the wheel, another L-shaped clip embracing the opposite edge of the rim of the wheel, a bolt extending through the clips and clamping them on the rim, the bolt having a head located in the pivotal path of the tappet arm and constituting a stop for engagement by one end portion of said pivoted tappet member.

RAYMOND G. RODKEY.

References Cited in the file of this patent

UNITED STATES PATENTS

| Number | Name | Date |
|---|---|---|
| 14,450 | German et al. | Mar. 18, 1856 |
| 16,617 | Thomason | Feb. 10, 1858 |
| 757,999 | Davis | Apr. 19, 1904 |
| 1,142,481 | Bevis | June 8, 1915 |
| 1,252,658 | Butler | Jan. 8, 1918 |
| 1,726,886 | Carlton | Sept. 3, 1929 |
| 1,778,622 | Bergsten | Oct. 14, 1930 |
| 2,320,024 | Anderson | May 25, 1943 |
| 2,381,202 | Bowen et al. | Aug. 7, 1945 |